United States Patent
Lin et al.

(10) Patent No.: US 9,353,929 B2
(45) Date of Patent: May 31, 2016

(54) BEAM DIFFUSING MODULE AND BEAM GENERATING SYSTEM

(71) Applicant: Industrial Technology Research Institute, Hsinchu (TW)

(72) Inventors: Yu-Chung Lin, Tainan (TW); Min-Kai Lee, Tainan (TW); Sung-Ho Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 408 days.

(21) Appl. No.: 14/140,482

(22) Filed: Dec. 25, 2013

(65) Prior Publication Data

US 2015/0153018 A1 Jun. 4, 2015

(30) Foreign Application Priority Data

Dec. 2, 2013 (TW) .............................. 102144105 A

(51) Int. Cl.
*F21V 7/00* (2006.01)
*F21V 7/22* (2006.01)
*F21V 13/02* (2006.01)
(Continued)

(52) U.S. Cl.
CPC .................. *F21V 7/0033* (2013.01); *F21V 7/22* (2013.01); *F21V 13/02* (2013.01); *F21V 13/04* (2013.01); *H01S 3/005* (2013.01)

(58) Field of Classification Search
CPC G02B 19/00–19/0095; G02B 27/09–27/0994; H01S 3/005
USPC ......... 359/599, 606, 615, 618–641, 850–851, 359/857, 861; 362/551–554, 558, 560, 362/257–311.15, 317–361
See application file for complete search history.

(56) References Cited

U.S. PATENT DOCUMENTS

| 5,109,465 A | 4/1992 | Klopotek |
| 5,224,200 A | 6/1993 | Rasmussen et al. |
| 5,303,084 A * | 4/1994 | Pflibsen ................. G02B 27/09 359/503 |

(Continued)

FOREIGN PATENT DOCUMENTS

| TW | 200500666 | 1/2005 |
| TW | I292245 | 1/2008 |

OTHER PUBLICATIONS

Cheng-Huan Chen, et al., "Light Pipe Line Beam Shaper," Optical Review, vol. 14, No. 4, Apr. 25, 2007, pp. 231-235.

(Continued)

*Primary Examiner* — Bumsuk Won
*Assistant Examiner* — Jeffrey Madonna
(74) *Attorney, Agent, or Firm* — Jianq Chyun IP Office

(57) ABSTRACT

A beam diffusing module including a light incident terminal, a light emitting terminal, a first reflective plate and a second reflective plate is provided. The first reflective plate and the second reflective plate are disposed on a transmission path of a laser beam. At least one of the first reflective plate and the second reflective plate has a plurality of reflective micorstructures. The reflective micorstructures are arranged along a second direction from the light incident terminal towards the light emitting terminal. At least a part of the laser beam enters the beam diffusing module through the light incident terminal and emerges from the light emitting terminals after being reflected repeatedly by the first reflective plate and the second reflective plate to cause an M squared of the laser beam to be redistributed along a first direction. A beam generating system is also provided.

33 Claims, 11 Drawing Sheets

(51) Int. Cl.
*F21V 13/04* (2006.01)
*H01S 3/00* (2006.01)

(56) References Cited

U.S. PATENT DOCUMENTS

| | | | |
|---|---|---|---|
| 5,825,551 A | 10/1998 | Clarkson et al. | |
| 6,075,650 A * | 6/2000 | Morris | G02B 27/09 359/641 |
| 7,387,954 B2 | 6/2008 | Tanaka et al. | |
| 7,413,311 B2 | 8/2008 | Govorkov et al. | |
| 7,418,172 B2 | 8/2008 | Tanaka et al. | |
| 7,565,050 B2 | 7/2009 | Lee et al. | |
| 7,762,673 B2 | 7/2010 | Kim et al. | |
| 2004/0091209 A1* | 5/2004 | Mikhailov | G02B 27/09 385/31 |
| 2005/0068633 A1* | 3/2005 | Grenier | G02B 27/0977 359/627 |
| 2007/0268572 A1* | 11/2007 | Hu | G02B 27/0961 359/349 |
| 2009/0204109 A1* | 8/2009 | Grove | A61B 18/203 606/9 |
| 2011/0286101 A1* | 11/2011 | Fornahl | G02B 27/0961 359/627 |
| 2013/0231644 A1* | 9/2013 | Hanft | A61F 9/00827 606/5 |

OTHER PUBLICATIONS

Roland Bitterli, et al., "Refractive statistical concave 1D diffusers for laser beam shaping," Proc. SPIE, vol. 7062, Sep. 17, 2008, pp. 1-8.

Frank Wippermann, et al., "Beam homogenizers based on chirped mirolens arrays," Optics Express, May 14, 2007, vol. 15, No. 10, pp. 1-14.

Arnold Daniels, et al., "Generation of uniform lines with variable size using a beam shaping hybrid zoom optical system," Proc. SPIE, vol. 5175, Nov. 5, 2003, pp. 1-15.

O. Homburg, et al., "Refractive beam shaping—from Maxwell's Equations to products and applications in laser materials processing," Proc. SPIE, vol. 6663, Sep. 12, 2007, pp. 1-12.

DTF Technology GmbH, "Ultra Short Time Annealing"(http://www.thin-film.de/en/technology/flash-lamp-processing.html), Jun. 7, 2010, pp. 1-2.

Lissotschenko Mikrooptik GmbH, "Green Line Laser Annealing"(http://www.limo.de/en/products-amp-solutions/beam-shaping-systems/green-line-uv-line/), May 8, 2012, pp. 1-2.

* cited by examiner

BEAM DIFFUSING MODULE AND BEAM GENERATING SYSTEM

CROSS-REFERENCE TO RELATED APPLICATION

This application claims the priority benefit of Taiwan application serial no. 102144105, filed on Dec. 2, 2013. The entirety of the above-mentioned patent application is hereby incorporated by reference herein and made a part of this specification.

TECHNICAL FIELD

The disclosure relates to a beam diffusing module and a beam generating system.

BACKGROUND

Since laser beam has advantages of good collimation, high power and high light intensity, laser beam generating apparatuses have a wide range of application in modern industry. Taking a manufacturing application of a laser light source on touch panel in electronic industry as an example, through laser modification, crystallinity of indium-tin oxide (ITO) of local area can be enhanced, by which chemical resistance, weatherability and resistance stability of ITO thin film can be enhanced, so as to improve product quality, and the laser light source can also be applied to a laser lift off (LLO) technique of an organic light emitting device (OLED) or a laser annealing process of an insulated-gate bipolar transistor (IGBT).

However, since the laser beam emitted by the laser light source has high coherence, when the laser beam irradiates an unsmooth object surface (for example, a lens or a reflector, etc. having surface microstructures), the laser beam from the object surface has an interference to produce speckles on the irradiation surface. The speckles are irregular noise-like patterns (for example, irregular bright and dark stray dots), which may lead to uneven illumination on the irradiation surface, and cause reduction of optical quality of a device using the laser light source.

SUMMARY

An embodiment of the disclosure provides a beam diffusing module, which is adapted to change an M squared of a laser beam along a first direction. The beam diffusing module includes a light incident terminal, a light emitting terminal, a first reflective plate and a second reflective plate. The laser beam sequentially passes through the light incident terminal and the light emitting terminal. The first reflective plate has a first reflective surface, and the first reflective plate is disposed on a transmission path of the laser beam, and extends from the light incident terminal to the light emitting terminal. The second reflective plate has a second reflective surface, and the second reflective plate is disposed on the transmission path of the laser beam, and extends from the light incident terminal to the light emitting terminal. The first reflective surface and the second reflective surface are opposite to each other. At least one of the first reflective surface of the first reflective plate and the second reflective surface of the second reflective plate has a plurality of reflective microstructures. The reflective microstructures are arranged along a second direction from the light incident terminal towards the light emitting terminal. At least a part of the laser beam enters the beam diffusing module through the light incident terminal and emerges from the light emitting terminal to cause an M squared of the laser beam emitted from the beam diffusing module to be redistributed along the first direction. The beam diffusing module complies with $\theta_m < (N+M)K/2 < 180$, where N is a divergence angle of the first reflective surface for the laser beam, M is a divergence angle of the second reflective surface for the laser beam, K is the number of reflecting times of the laser beam reflected by the first reflective surface and the second reflective surface, and $\theta_m$ is an original divergence angle of the laser beam.

An embodiment of the disclosure provides a beam generating system including a laser light source, the aforementioned beam diffusing module and a light homogenizing module. The laser light source outputs a laser beam. The beam diffusing module is disposed on a transmission path of the laser beam. The light homogenizing module is disposed on a transmission path of the laser beam coming from the beam diffusing module.

An embodiment of the disclosure provides a beam generating system including a laser light source, a beam diffusing module and a light homogenizing module. The laser light source outputs a laser beam. The beam diffusing module is adapted to change an M squared of the laser beam along a first direction, and includes a reflective cylinder. The reflective cylinder is disposed on a transmission path of the laser beam, and an outer surface of the reflective cylinder has a plurality of reflective microstructures, where the reflective cylinder axially extends along a second direction, and the reflective microstructures have a bar-shape and extend along the second direction. The light homogenizing module is disposed on a transmission path of the laser beam coming from the light diffusing module. At least a part of the laser beam enters the beam diffusing module, and is incident on the reflective microstructures of the reflective cylinder, and is further reflected and propagated towards the light homogenizing module to cause the M squared of the laser beam emitted from the beam diffusing module to be redistributed along the first direction. The beam diffusing module complies with $\theta_m < \beta + \epsilon < 180$, where $\beta$ is a divergence angle of the reflective microstructures on the outer surface of the reflective cylinder, $\epsilon$ is a divergence angle of a curved surface of the reflective cylinder, and $\theta_m$ is an original divergence angle of the laser beam.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
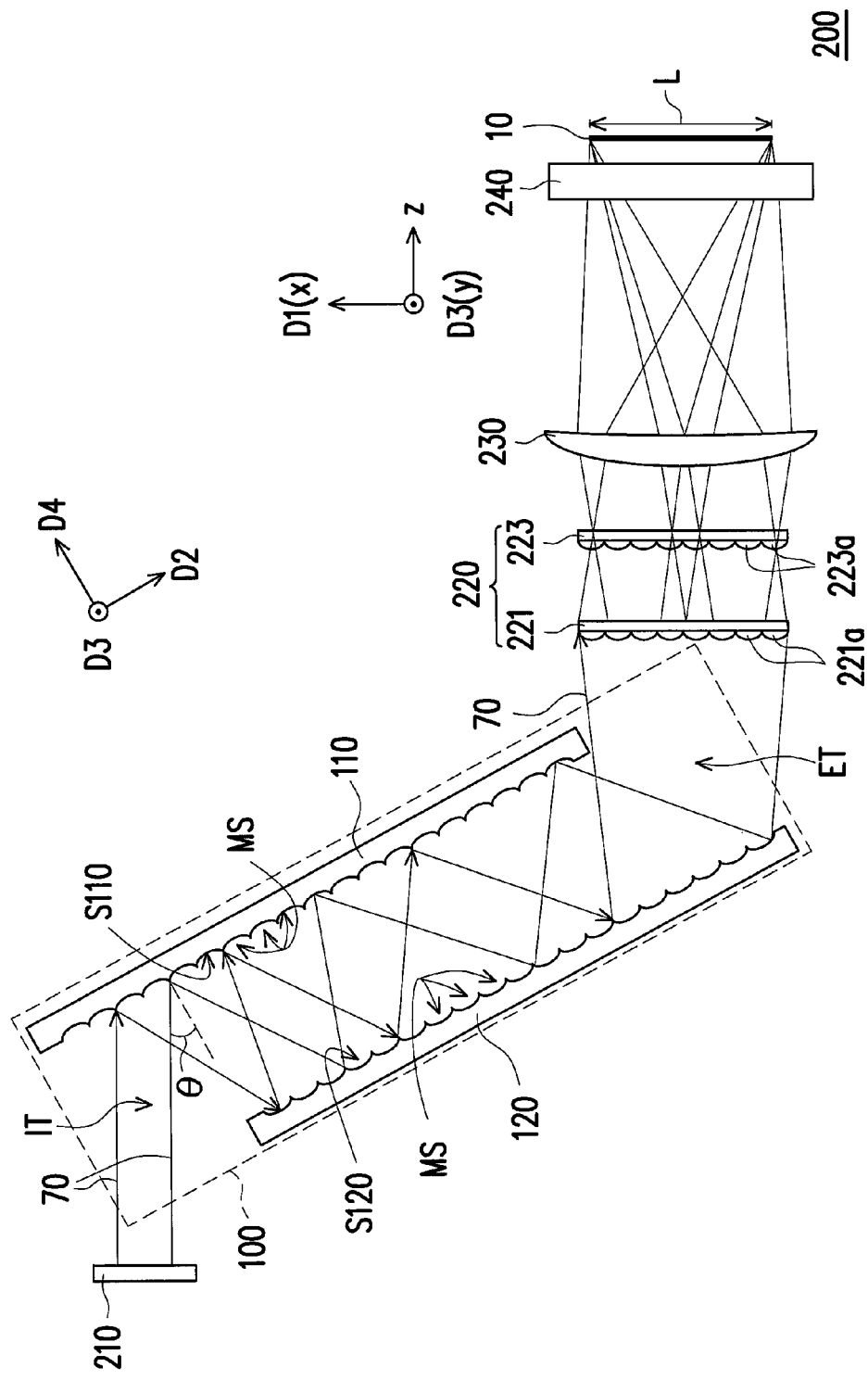
FIG. 1A is a cross-sectional view of a beam generating system according to an embodiment of the disclosure.
Figure 1B:
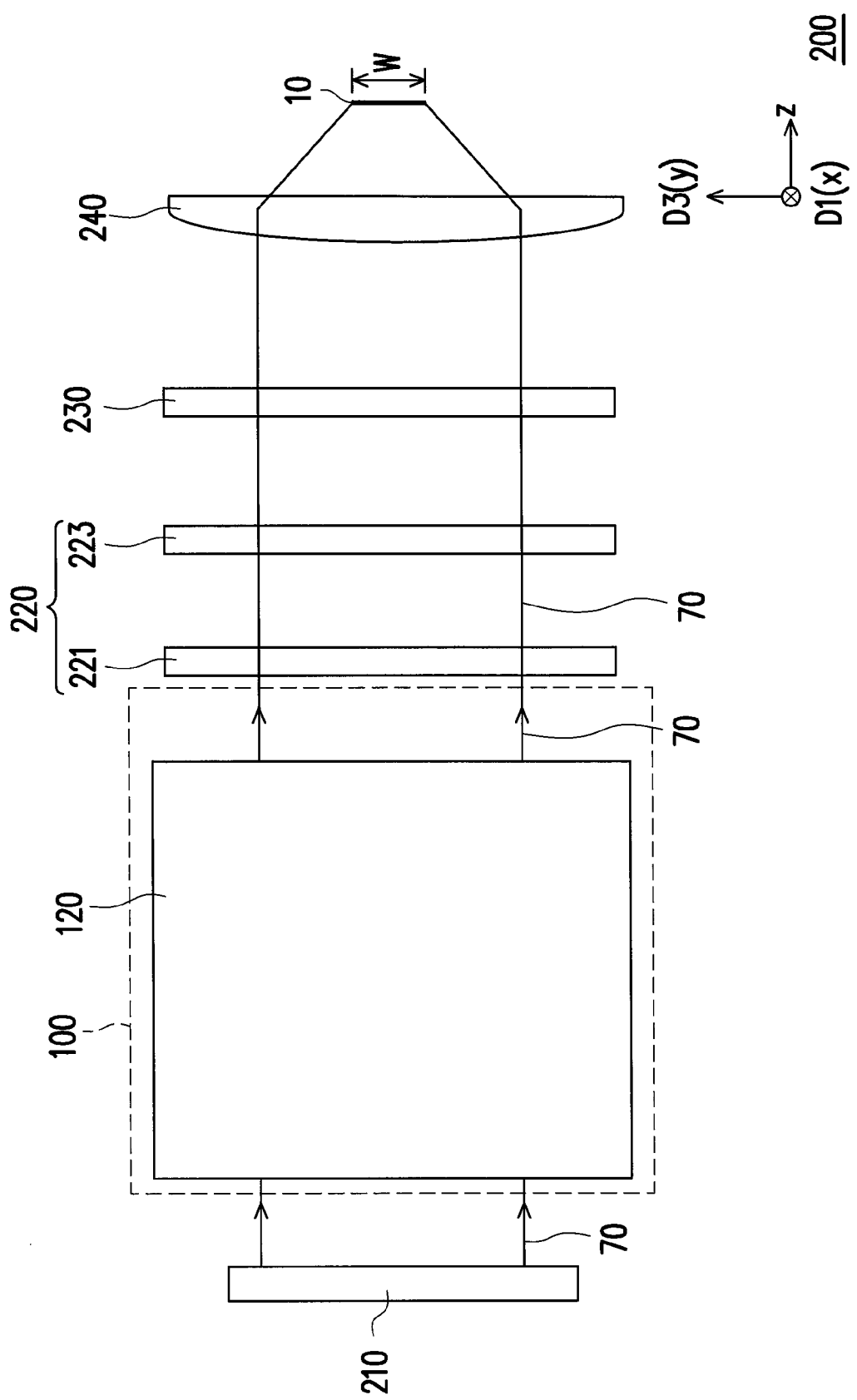
FIG. 1B is another cross-sectional view of the beam generating system of FIG. 1A.

FIG. 1A is a cross-sectional view of a beam generating system according to an embodiment of the disclosure. FIG. 1B is another cross-sectional view of the beam generating system of FIG. 1A. Referring to FIG. 1A and FIG. 1B, the beam generating system 200 of the present embodiment includes a laser light source 210, a beam diffusing module 100 and a light homogenizing module 220. The laser light source 210 emits a laser beam 70. In the present embodiment, the laser beam 70 is, for example, a pulse laser beam, and a wavelength of the laser beam 70 falls within a range of 50 nm to 1000 µm. However, the range of the wavelength of the laser beam 70 is not limited by the present embodiment.

As that shown in FIG. 1A and FIG. 1B, in the present embodiment, the beam diffusing module 100 is disposed on a transmission path of the laser beam 70, which is mainly used to redistributes the energy of the incident laser beam 70, and is adapted to change an M squared (i.e. a beam parameter product (BPP) ratio) of the laser beam 70 along a first direction D1. In the present embodiment, the first direction D1 is, for example, an x-direction. The M squared refers to a ratio between a BPP of the actual laser beam 70 and a BPP of an ideal Gaussian beam with the same wavelength. The M squared ($M^2$) is defined as follows:

$$M^2 = \frac{2W_m \cdot 2\theta_m}{4\lambda/\pi} \quad (i)$$

where $W_m$ is a radius of a beam waist of the laser beam 70 (the narrowest part of the laser beam 70), $\theta_m$ is a divergence angle α (half angle) of the laser beam 70, and λ is the wavelength of the laser beam 70. The M squared ($M^2$) of the ideal Gaussian beam is 1. Namely, the closer the M squared ($M^2$) of the laser light source 210 approaches to 1, the more the energy distribution of the actual laser beam 70 is close to the energy distribution of the ideal Gaussian beam, and the more liable the laser beam 70 has a good quality and high coherence, so that the M squared $M^2$ is also referred to as a laser quality coefficient.

Figure 1C:
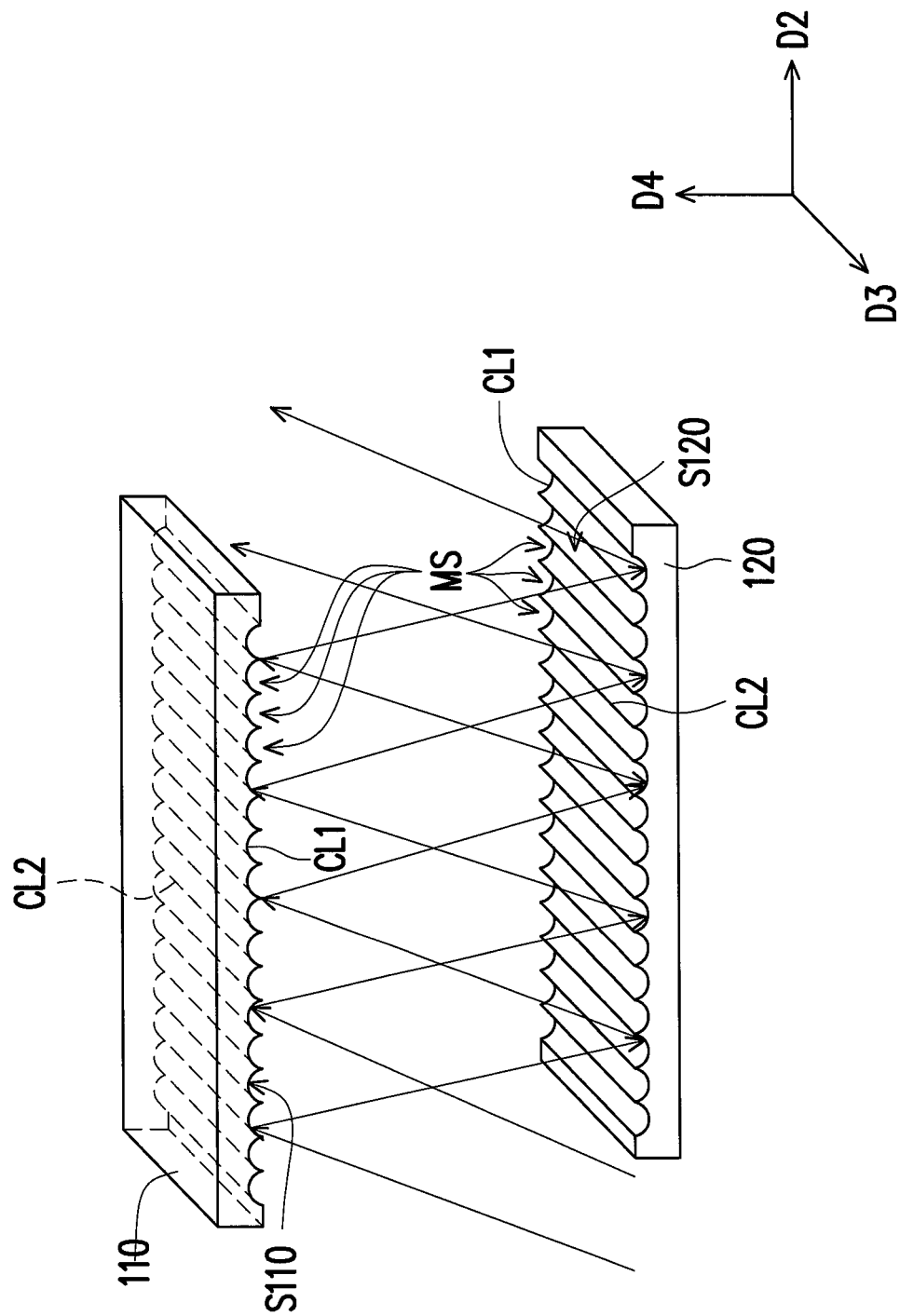
FIG. 1C is a three-dimensional view of a beam diffusing module of FIG. 1A.

FIG. 1C is a three-dimensional view of the beam diffusing module of FIG. 1A. Referring to FIG. 1A to FIG. 1C, in detail, in the present embodiment, the beam diffusing module 100 includes a light incident terminal IT, a light emitting terminal ET, a first reflective plate 110 and a second reflective plate 120. As that shown in FIG. 1A, the laser beam 70 sequentially passes through the light incident terminal IT and the light emitting terminal ET. The first reflective plate 110 is disposed on the transmission path of the laser beam 70, and extends from the light incident terminal IT towards the light emitting terminal ET. The second reflective plate 120 is disposed on the transmission path of the laser beam 70, and also extends from the light incident terminal IT towards the light emitting terminal ET.

In detail, as that shown in FIG. 1A and FIG. 1C, the first reflective plate 110 and the second reflective plate 120 respectively have a first reflective surface S110 and a second reflective surface S120, and the first reflective surface S110 and the second reflective surface S120 are opposite to each other. In the present embodiment, the first reflective surface S110 and the second reflective surface S12 are specular reflection coatings, though the disclosure is not limited thereto. In detail, in the present embodiment, at least one of the first reflective surface S110 of the first reflective plate 110 and the second reflective surface S120 of the second reflective plate 120 has a plurality of reflective microstructures MS. The reflective microstructures MS are located on the first reflective surface S110 of the first reflective plate 110 and the second reflective surface S120 of the second reflective plate 120. Moreover, in the present embodiment, when the reflective microstructures MS are cut along a second direction D2 and a direction perpendicular to a third direction D3, an obtained section line CL1 includes a plurality of depressed curves respectively curving towards opposite sides of the first reflective surface S110 and the second reflective surface S120. When each of the reflective microstructures MS is cut along the third direction D3 and a direction perpendicular to the second direction D2, an obtained section line CL2 is a straight line. In other words, in the present embodiment, the reflective microstructures MS are bar-shape microstructures, and are arranged along the second direction D2 from the light incident terminal IT towards the light emitting terminal ET, and extend along the third direction D3. In the present embodiment, the third direction D3 is a y-direction, and the third direction D3 is substantially perpendicular to the first direction D1 (i.e. the x-direction) and the second direction D2. Moreover, the first reflective plate 110 and the second reflective plate 120 are arranged along the fourth direction D4. In the present embodiment, the first direction D1, the second direction D2 and the fourth direction D4 are coplanar, and the second direction D2, the third direction D3 and the fourth direction D4 are substantially perpendicular to each other, though the disclosure is not limited thereto.

Further, as that shown in FIG. 1A, a direction along which the laser beam 70 is incident on the beam diffusing module 100 and the fourth direction D4 have an included angle θ therebetween. At least a part of the laser beam 70 enters the beam diffusing module 100 through the light incident terminal IT, and is repeatedly reflected by the first reflective surface S110 of the first reflective plate 110 and the second reflective surface S120 of the second reflective plate 120, and then emerges from the light emitting terminal ET to result in a fact that the M squared ($M^2$) of the laser beam emitted from the beam diffusing module 100 is redistributed along the first direction D1 (i.e. the x-direction). Then, the laser beam 70 emits from the beam diffusing module 100.

With reference of FIG. 2A to FIG. 3, a process that the M squared ($M^2$) of the laser beam is redistributed along the first direction D1 (i.e. the x-direction) is further described below according to a detailed structure design of the reflective microstructures MS.

Figure 2A:
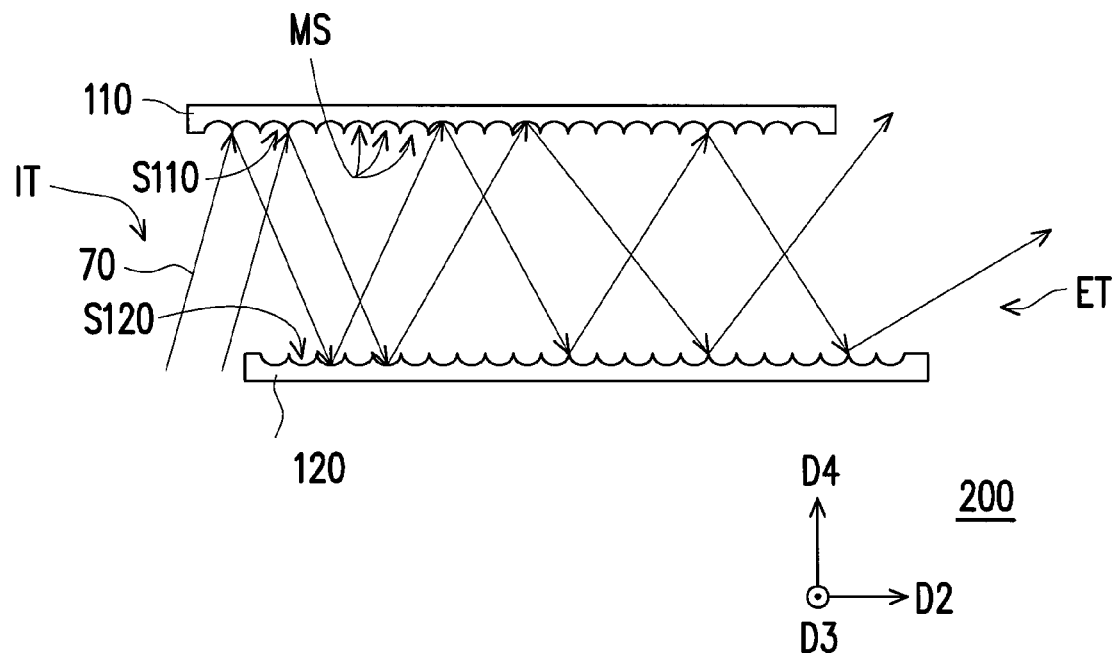
FIG. 2A is a cross-sectional view of a first reflective plate and a second reflective plate of FIG. 1A.
Figure 2B:
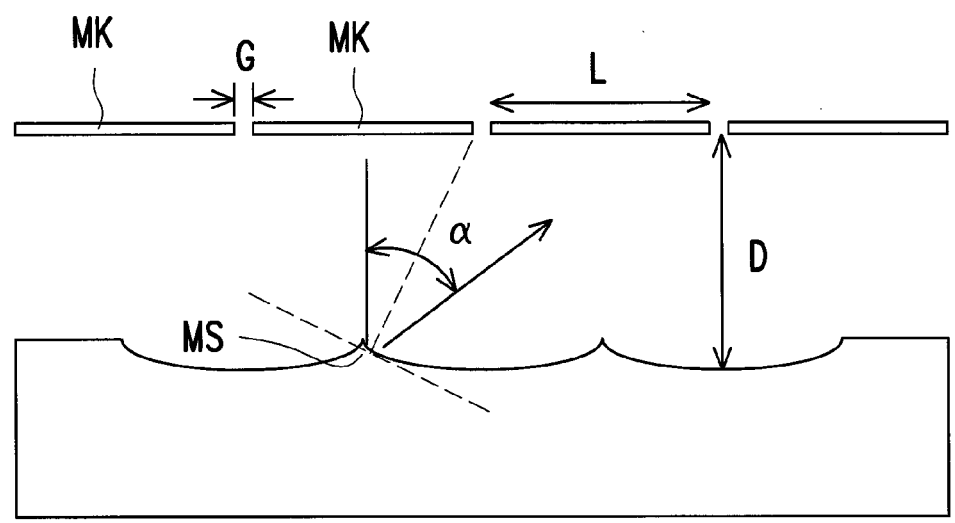
FIG. 2B is an enlarged view of reflective microstructures of FIG. 2A.

FIG. 2A is a cross-sectional view of the first reflective plate and the second reflective plate of FIG. 1A. FIG. 2B is an enlarged view of the reflective microstructures of FIG. 2A. Referring to FIG. 2A and FIG. 2B, in the present embodiment, each of the reflective microstructures MS has a divergence angle α. For example, the divergence angle α of each of the reflective microstructures MS falls within a range of 0.1 degree to 5 degrees. The above value range is used as an example, and the disclosure is not limited thereto.

Further, as that shown in FIG. 2B, in the present embodiment, forming of the reflective microstructures MS can be implemented through a semiconductor manufacturing process, and the reflective microstructures MS may have a random structure arrangement within a certain range. For example, in the present embodiment, a plurality of masks MK can be used to etch the first reflective surface S110 of the first reflective plate 110 or the second reflective surface S120 of the second reflective plate 120. In detail, in the present embodiment, the etching method is, for example, isotropic etching. In this way, a plurality of curved surfaces can be formed on the first reflective surface S110 of the first reflective plate 110 or the second reflective surface S120 of the second reflective plate 120, and a width L of the mask MK and a gap G between the masks MK determine a pitch P between the reflective microstructures MS. In order to ensure that the divergence angle α of each of the reflective microstructures MS falls within the range of 0.1 degree to 5 degrees, the width L of the mask MK is far greater than the gap G between the masks MK, and the pitch P between the reflective microstructures MS can also be approximately regarded as the width L of the mask MK. On the other hand, since the etching method of the present embodiment is isotropic etching, a longest vertical distance D between each of the masks MK and the reflective microstructure MS is a radius of curvature D of the reflective surface of each of the reflective microstructures MS. Therefore, according to a trigonometric relationship, it is known that the divergence angle α is $\alpha=\sin^{-1}(D/2P)$.

Further, in the present embodiment, during the etching process, the width L of the mask MK and the gap G between the masks MK can be finely tuned to implement an angle design of the divergence angle α of each of the reflective microstructures MS. For example, as that shown in FIG. 2A, in the present embodiment, the divergence angles α of at least a part of the reflective microstructures MS are different to each other, and the reflective microstructures MS having different divergence angles are randomly arranged along the second direction D2, for example, the reflective microstructures MS are randomly arranged in a pitch of 50±10 μm, though the disclosure is not limited thereto. In other embodiments, the reflective microstructures MS having different divergence angles α may have other arrangements, which is described below with reference of FIG. 2C and FIG. 2D.

Figure 2C:
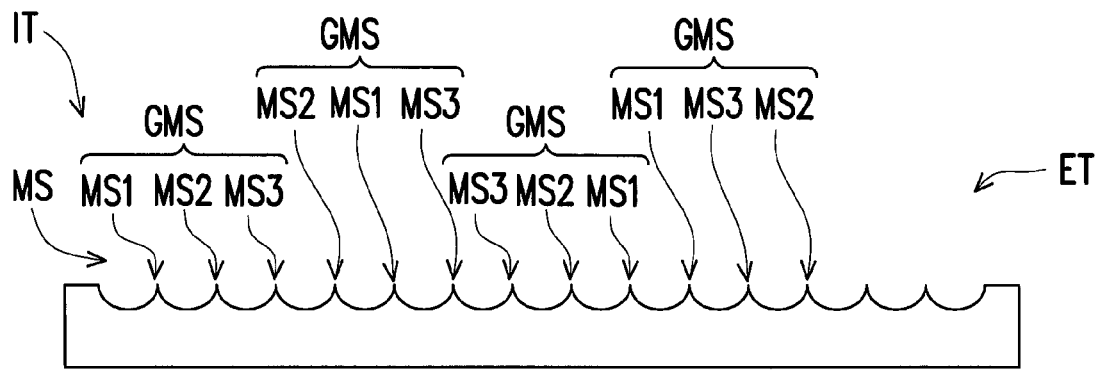
FIG. 2C is an enlarged view of another type of the reflective microstructures of FIG. 2A.
Figure 2D:
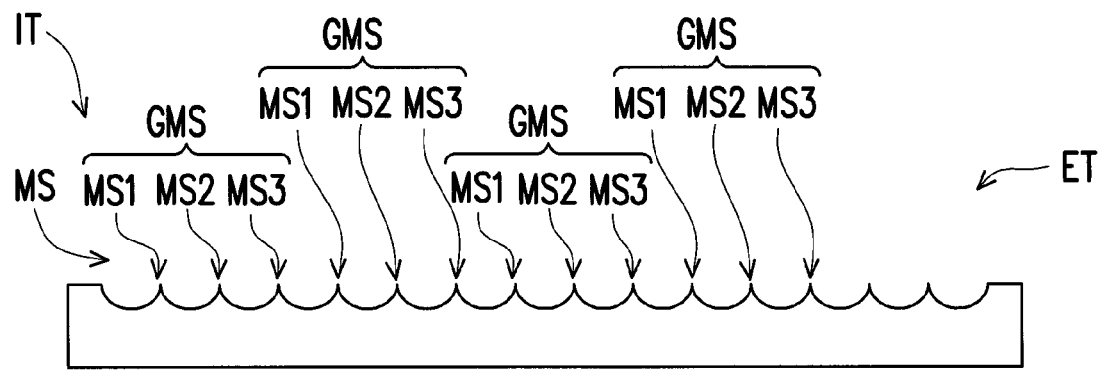
FIG. 2D is an enlarged view of still another type of the reflective microstructures of FIG. 2A.

FIG. 2C is an enlarged view of another type of the reflective microstructures of FIG. 2A. FIG. 2D is an enlarged view of still another type of the reflective microstructures of FIG. 2A. Referring to FIG. 2C, in detail, in the present embodiment, the reflective microstructures MS may construct a plurality of reflective microstructure groups GMS, and the reflective microstructure groups GMS are arranged along the second direction D2, and the number of the reflective microstructures MS having the same divergence angle in each of the reflective microstructure groups GMS is the same. Moreover, an arranging sequence of the reflective microstructures MS, for example, MS1, MS2, MS3 in each of the reflective microstructure groups GMS is random. For example, when the divergence angles α of the reflective microstructures MS1, MS2 and MS3 are respectively 2 degrees, 3 degrees and 4 degrees, the reflective microstructures MS1, MS2 and MS3 sequentially arranged along the second direction D2 from the light incident terminal IT to the light emitting terminal ET in different reflective microstructure groups GMS may have different permutation and combination, for example, 2 degrees, 3 degrees, 4 degrees; 3 degrees, 2 degrees, 4 degrees; 4 degrees, 3 degrees, 2 degrees; and 2 degrees, 4 degrees, 3 degrees, etc. In other words, the reflective microstructures MS of the present embodiment present a short periodic (for example, one period of three pitches) random arrangement along the second direction D2.

On the other hand, in another embodiment, as that shown in FIG. 2D, the divergence angles α of at least a part of the reflective microstructures MS are different to each other, and the reflective microstructures MS having different divergence angles are arranged along the second direction D2 in alternation. For example, when the divergence angles α of the reflective microstructures MS1, MS2 and MS3 are, for example, 2 degrees, 3 degrees and 4 degrees, the reflective microstructures MS1, MS2 and MS3 sequentially arranged along the second direction D2 from the light incident terminal IT to the light emitting terminal ET in different reflective microstructure groups GMS may have the same arrangement, for example, one of the permutation and combinations consisting of 2 degrees, 3 degrees, 4 degrees; 3 degrees, 4 degrees, 2 degrees; 3 degrees, 2 degrees, 4 degrees; and 4 degrees, 3 degrees, 2 degrees, etc. In other words, the reflective microstructures MS of the present embodiment present a periodic arrangement along the second direction D2.

Moreover, referring to FIG. 2A and FIG. 2B, in the present embodiment, the first reflective surface S110 and the second reflective surface S120 all have the reflective microstructures MS, and each of the reflective microstructures MS on the first reflective surface S110 corresponds to one of the reflective microstructures MS on the second reflective surface S120, and the divergence angles α of the corresponding reflective microstructures MS are the same, though the disclosure is not limited thereto. In other embodiments, the divergence angles α of the corresponding reflective microstructures MS can also be different.

Further, in the embodiments of FIG. 2A, FIG. 2C and FIG. 2D, the beam diffusing module 100 is complied with $\theta_m<(N+M)K/2<180$, where N is a divergence angle α of the reflective microstructures MS on the first reflective surface S110, M is a divergence angle α of the reflective microstructures MS on the second reflective surface S120, K is the number of reflecting times of the laser beam 70 reflected by the first reflective surface and the second reflective surface, and $\theta_m$ is an original divergence angle of the laser beam 70. For example, in the present embodiment, the divergence angle α of the reflective microstructure MS on the first reflective surface S110 and the divergence angle α of the reflective microstructure MS on the second reflective surface S120 are all 0.1 degree. The above value range is used as an example, and is not used to limit the disclosure. In the above description, a situation that both of the first reflective surface S110 and the second reflective surface S120 have the reflective microstructures MS is taken as an example for description, however, in other embodiments, one of the reflective surfaces has the reflective microstructures MS, and the other reflective surface is one of a plane, a concave surface and a convex surface (which is described in detail later with reference of FIG. 4, FIG. 5 and FIG. 6), and the beam diffusing module 100 is still complied with $\theta_m<(N+M)K/2<180$, where M and N respectively represent the divergence angles of the first reflective surface and the second reflective surface for the incident laser beam 70. Namely, when the first reflective surface S110 and the second reflective surface S120 have the reflective microstructures MS, M and N respectively represent the divergence angles of the corresponding reflective microstructures MS, and when the first reflective surface S110 and the second reflective surface S120 are other surfaces, M and N are divergence angles of the corresponding surfaces. Further, although M and N are defined as divergence angles, they are used to represent directionality of the optical path, and are not used to represent a divergent function of the first reflective surface and the second reflective surface. Namely, when the first reflective surface or the second reflective surface has a convergence angle for the light beam, M or N may have a negative value to represent convergence of the reflective surface thereof.

Moreover, the beam diffusing module 100 is also complied with $$M^2 \approx \frac{2W_0 \cdot R}{(4\lambda/\pi)f} \quad \text{(ii)}$$

where $2W_0$ is a light spot diameter when the laser beam is focused, f is a focal length of a third lenticular lens array (which is described later), R is a raw beam diameter of the incident laser beam 70. Therefore, by merging (i) and (ii), it is known that evenness of the light spot is directly proportional to the divergence angle $\theta_m$ of the laser beam 70. Further, in the present embodiment, since the divergence angle $\theta_m$ of the laser beam 70 can be adjusted by the divergence angle α of the reflective microstructures MS when the laser beam 70 is repeatedly reflected in the beam diffusing module 100, the M squared ($M^2$) of the laser beam 70 is redistributed.

In this way, by configuring the reflective microstructures MS to the beam diffusing module 100, at least a part of the laser beam 70 is repeatedly reflected in the beam diffusing module 100 by the first reflective plate 110 and the second reflective plate 120, such that the M squared ($M^2$) of the laser beam 70 emitted from the beam diffusing module 100 is redistributed along the first direction D1 (i.e. the x-direction), and the laser beam 70 forms single direction homogenisation (i.e. to increase $M_x^2$) along the first direction D1 (i.e. the x-direction) without influencing distribution of the laser beam 70 along the third direction D3 (i.e. the y-direction), i.e. $M_y^2$ is maintained unchanged.

Then, referring to FIG. 1A and FIG. 1B, in the present embodiment, the light homogenizing module 220 is disposed on the transmission path of the laser beam 70 emitted from the beam diffusing module 100. In the present embodiment, the light homogenizing module 220 is mainly used to change a shape of the incident laser beam 70 to a linear shape. The light homogenizing module 220 of the present embodiment includes a first lenticular lens array 221 and a second lenticular lens array 223. The first lenticular lens array 221 is disposed on the transmission path of the laser beam 70 emitted from the beam diffusing module 100. The second lenticular lens array 223 is disposed on the transmission path of the laser beam 70 emitted from the first lenticular lens array 221.

In detail, the first lenticular lens array 221 includes a plurality of first micro-lenticular lenses 221a, each of the first micro-lenticular lenses 221a extends along the third direction D3, and the first micro-lenticular lenses 221a are arranged along the first direction D1. The second lenticular lens array 223 includes a plurality of second micro-lenticular lenses 223a, each of the second micro-lenticular lenses 223a extends along the third direction D3, and the second micro-lenticular lenses 223a are arranged along the first direction D1. In the present embodiment, a convex surface of the first micro-lenticular lens 221a and a convex surface of the second micro-lenticular lens 223a, for example, face to the beam diffusing module 100.

Moreover, the beam generating system 200 of the present embodiment may further include a light converging lens 230 and a third lenticular lens 240. The light converging lens 230 is disposed on the transmission path of the laser beam 70 emitted from the light homogenizing module 220, and is located between the light homogenizing module 220 and the third lenticular lens 240. In the present embodiment, the light converging lens 230 can be a lenticular lens. Moreover, a curved surface of the light converging lens 230 is curved along the first direction D1 (as that shown in FIG. 1A), and is not curved along the third direction D3 (as that shown in FIG. 1B). The third lenticular lens 240 is disposed on the transmission path of the laser beam 70 emitted from the light converging lens 230. In the present embodiment, a curved surface of the third lenticular lens 240 is not curved along the first direction D1 (as that shown in FIG. 1A), and is curved along the third direction D3 (as that shown in FIG. 1B). In the present embodiment, the light converging lens 230 is used to superpose the laser beam 70 as the light spot of a long axis L along the first direction D1, and the third lenticular lens 240 is used to narrow the laser beam 70 as the light spot of a short axis W along the third direction D3.

Moreover, in the present embodiment, a convex surface of the third lenticular lens 240 faces the beam diffusing module 100. However, in other embodiments, the convex surface of the third lenticular lens 240 can also face away from the beam diffusing module 100. The third lenticular lens 240 converges the laser beam 70 emitted from the light converging lens 230, and outputs the laser beam 70 to form a linear light spot 10 on an irradiated object (or an objected to be processed).

Figure 3A:
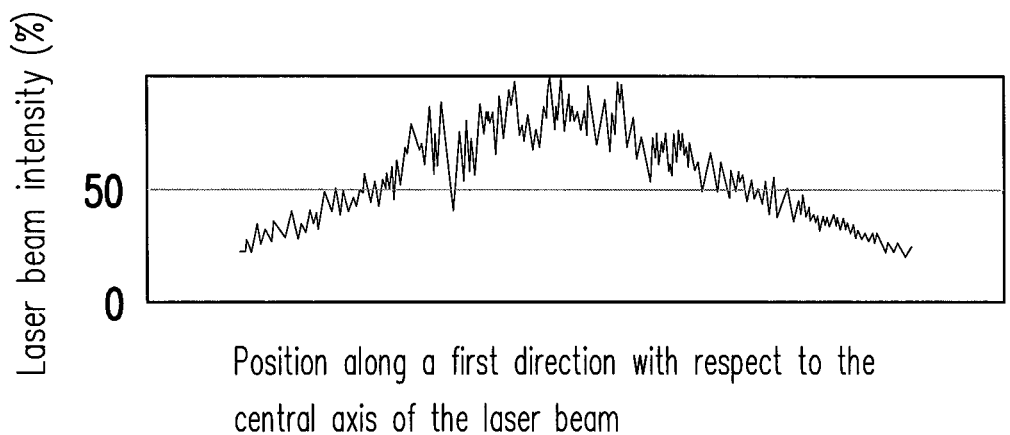
FIG. 3A and FIG. 3B are curves of laser beam intensity relative to positions along the first direction and the third direction with respect to the central axis of the laser beam before the laser beam passes through the beam diffusing module.
Figure 3B:
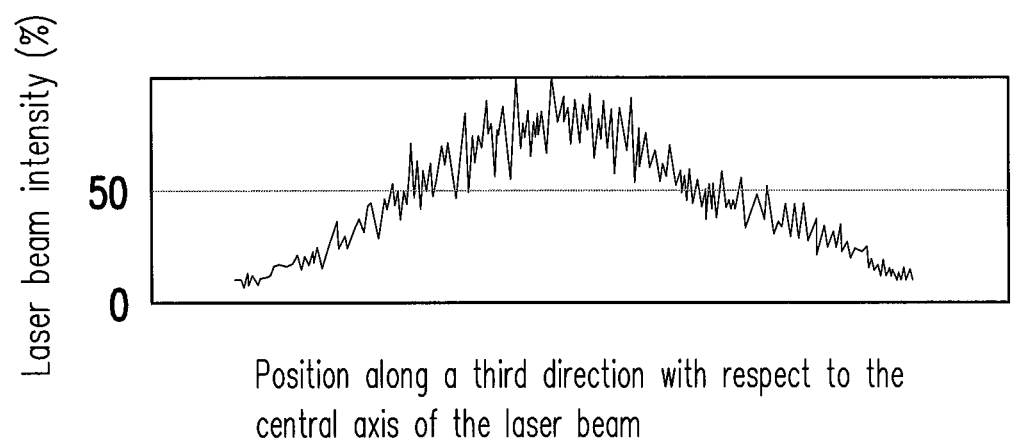
Figure 3C:
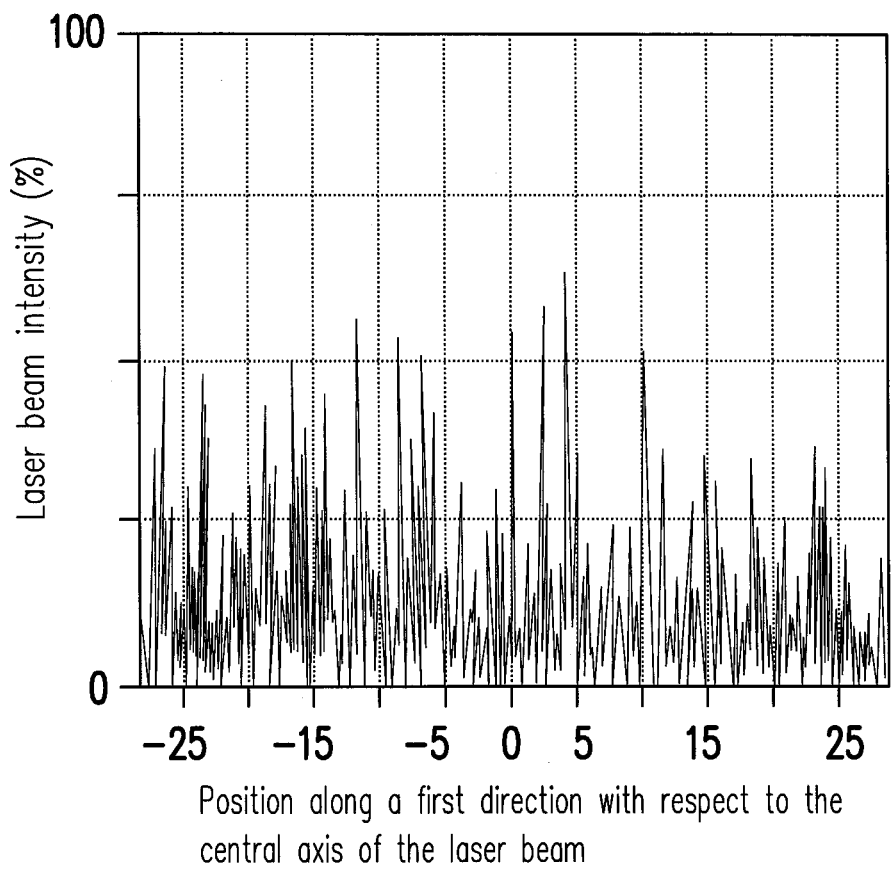
FIG. 3C and FIG. 3D are curves of laser beam intensity relative to positions along the first direction and the third direction with respect to the central axis of the laser beam after the laser beam of FIG. 1A is repeatedly reflected by the beam diffusing module.
Figure 3D:
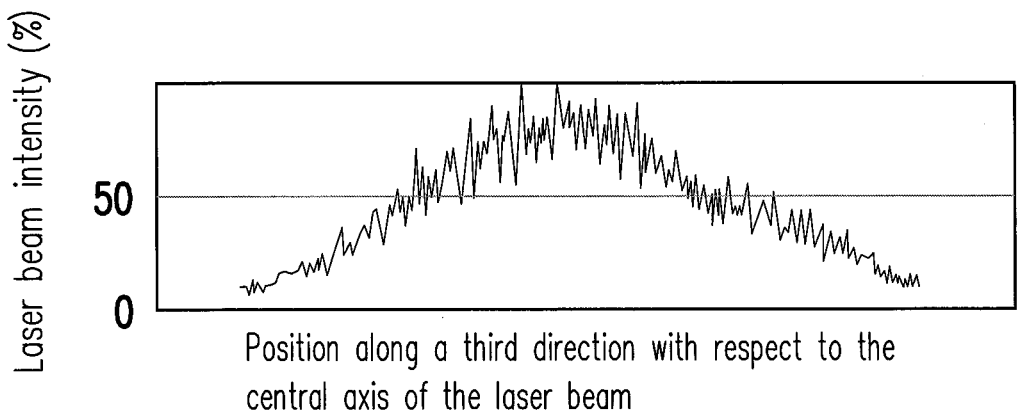

FIG. 3A and FIG. 3B are curves of laser beam intensity relative to positions along the first direction and the third direction with respect to the central axis of the laser beam before the laser beam passes through the beam diffusing module. FIG. 3C is a curve of laser beam intensity relative to positions along the first direction with respect to the central axis of the laser beam after the laser beam of FIG. 1A is repeatedly reflected by the beam diffusing module. FIG. 3D is a curve of laser beam intensity relative positions along the third direction with respect to the central axis of the laser beam after the laser beam of FIG. 1A is repeatedly reflected by the beam diffusing module. Referring to FIG. 3A and FIG. 3B, before the laser beam 70 passes through the beam diffusing module, the M squared $M_x^2$ of the laser beam 70 along the first direction D1 (i.e. the x-direction) is similar to the M squared $M_y^2$ of the laser beam 70 along the third direction D3 (i.e. the y-direction). Namely, the laser beam 70 has similar light intensity relative to position relationships on the first direction D1 and the third direction D3, and the light intensity relative to position relationship is, for example, close to a Gaussian distribution.

On the other hand, referring to FIG. 3C, after the laser beam 70 is repeatedly reflected by the reflective microstructures MS of the beam diffusing module, the laser beam 70 is changed from the original approximate Gaussian distribution to uniform distribution along the first direction D1 (i.e. the x-direction), and the M squared $M_x^2$ of the laser beam 70 along the first direction D1 is changed. In an embodiment, the M squared $M_x^2$ can be greater than 10. Moreover, referring to FIG. 3D, the distribution of the laser beam 70 emitted from the beam diffusing module 100 along the third direction D3 (i.e. the y-direction) is still close to the Gaussion distribution, so that the M squared $M_y^2$ of the laser beam 70 along the third direction D3 (i.e. the y-direction) is maintained unchanged. In an embodiment, the M squared $M_y^2$ is between 0.8 and 2. Since the M squared $M_x^2$ along the first direction D1 is changed, and since the M squared $M_y^2$ along the third direction D3 is maintained unchanged, in another embodiment, a ratio between the M squared $M_x^2$ of the laser beam 70 along the first direction D1 (i.e. the x-direction) that is emitted from the beam diffusing module 100 and the M squared $M_y^2$ of the laser beam 70 along the third direction D3 (i.e. the y-direction) that is emitted from the beam diffusing module 100 is greater than or equal to 5. In this way, long axis uniformity of the laser beam 70 is enhanced, and the short axis of the laser beam 70 can be maintained to a narrow line width. Therefore, when the laser beam 70 emitted from the beam diffusing module 100 is incident on the light homogenizing module 220, uniformity of the laser beam 70 can be further enhanced or a ratio between the long axis and the short axis thereof (L/W) can be changed through the light converging lens 230 and the third lenticular lens 240, so as to produce the linear light spot 10 to increase an irradiation length of the linear light spot 10, and accordingly increase an application range of the beam generating system 200.

For example, the beam generating system 200 can be applied to modify indium tin oxide (ITO). Presently, a material of sensing electrodes of a capacitive touch panel in the market is generally ITO, and durability, weatherability and resistance stability of the ITO greatly affect the quality of the capacitive touch panel. Since crystalline ITO has good durability, weatherability and resistance stability, in general industrial product, computers or high-class electronic products, the crystalline ITO is adopted to serve as the material of sensing electrodes. However, since the full crystalline ITO thin film is expensive, if the full crystalline ITO thin film is used to fabricate the sensing electrodes, the cost of the touch panel is increased, which is no avail for commercial competitiveness.

By using the linear light spot 10 generated by the beam generating system 200 of the present embodiment to irradiate noncrystalline ITO, the noncrystalline ITO can be crystallized. In this way, besides that the durability of the touch panel is enhanced, increase of the manufacturing cost of the touch panel due to using of the full crystalline ITO thin film is avoided. Moreover, by adjusting the divergence angle α of the reflective microstructures MS and the number of reflecting times of the laser beam 70 reflected by the first reflective plate 110 and the second reflective plate 120, the linear light spot 10 of the present embodiment may have higher energy under a unit area or longer irradiation length. Therefore, by using the linear light spot 10 generated by the beam generating system 200 to cystalize the ITO thin film, a crystallization degree of the ITO thin film under the unit area can be enhanced, or a crystallization area of the ITO thin film under a unit time can be increased. When the linear light spot 10 generated by the beam generating system 200 is used to ameliorate the ITO thin film, a long axis length L of the linear light spot 10 can be greater than or equal to a width of the ITO thin film, and the ITO thin film can substantially move along a direction perpendicular to the long axis of the linear light spot 10 to pass through the linear light spot 10. After the ITO thin film passes through the linear light spot 10 and is cooled down, modification thereof is completed.

Figure 4:
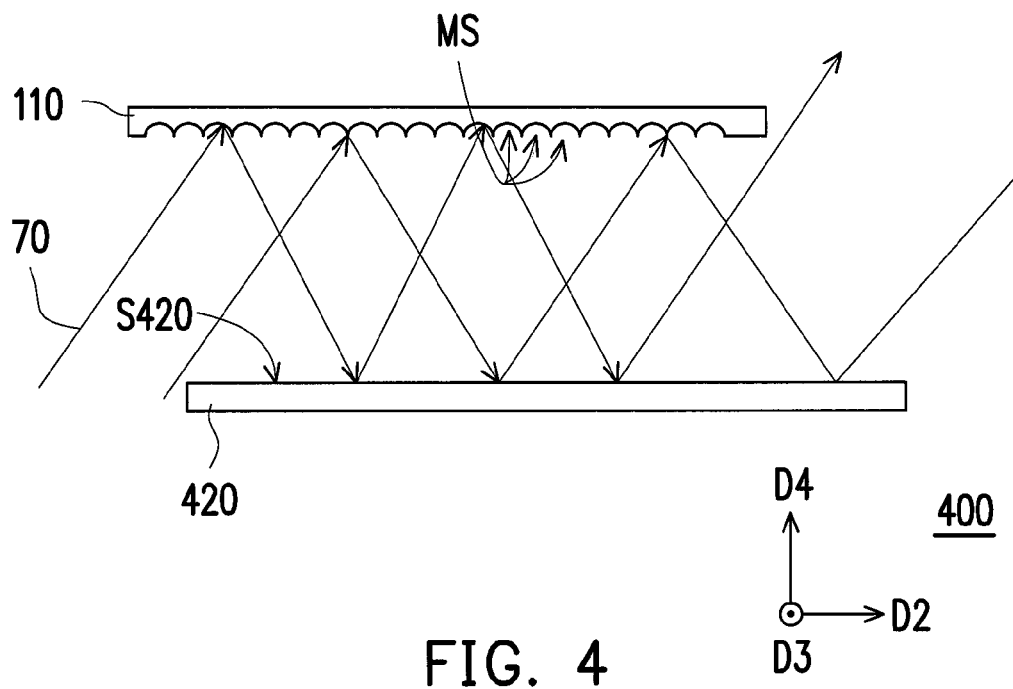
FIG. 4 is a cross-sectional view of a first reflective plate and a second reflective plate of another beam diffusing module of FIG. 1A.
Figure 5:
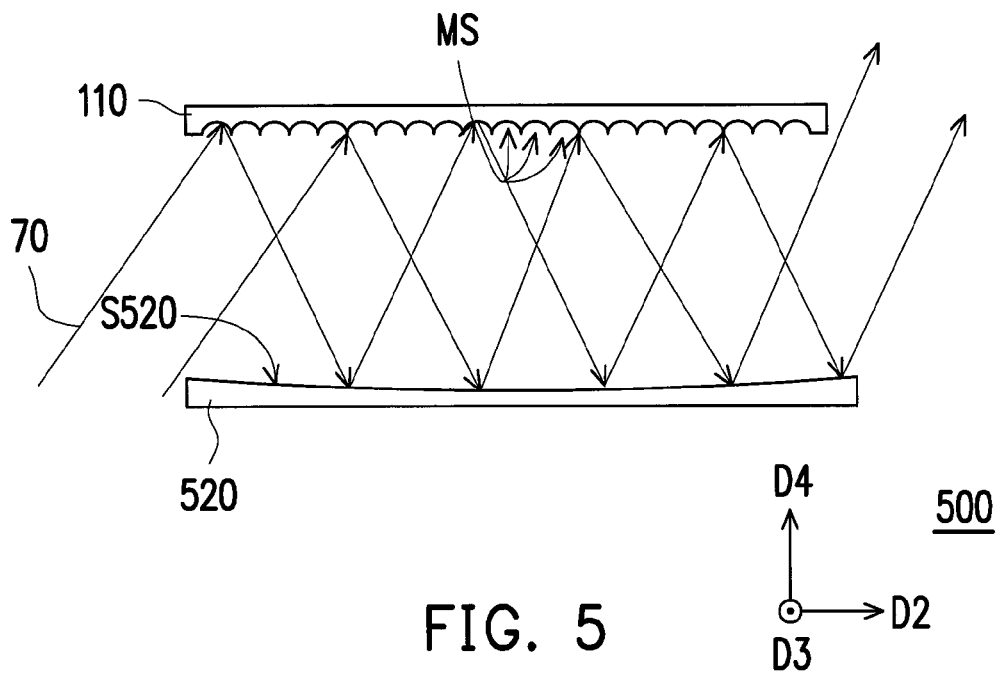
FIG. 5 is a cross-sectional view of a first reflective plate and a second reflective plate of still another beam diffusing module of FIG. 1A.
Figure 6:
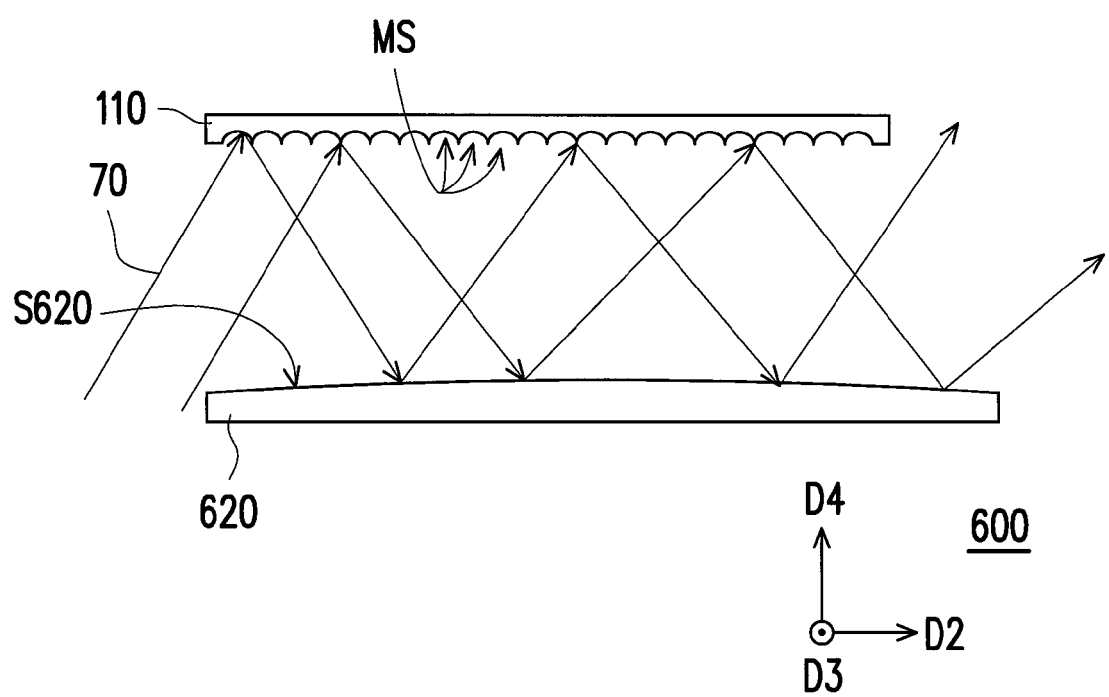
FIG. 6 is a cross-sectional view of a first reflective plate and a second reflective plate of yet another beam diffusing module of FIG. 1A.

Moreover, in the aforementioned embodiment, although a situation that both of the first reflective plate 110 and the second reflective plate 120 have the reflective microstructures MS is taken as an example for description, the disclosure is not limited thereto, and in other embodiments, the beam diffusing module 100 may have a configuration that one of the first reflective plate 110 and the second reflective plate 120 has the reflective microstructures MS, which is described below with reference of FIG. 4-FIG. 6.

FIG. 4 is a cross-sectional view of a first reflective plate and a second reflective plate of another beam diffusing module of FIG. 1A. Referring to FIG. 4, the beam diffusing module 400 is similar to the beam diffusing module 100 of FIG. 2A, and a difference therebetween is as follows. One of the first reflective surface S110 and the second reflective surface S420 of the beam diffusing module 400 has the reflective microstructures MS, and the other one is a plane. For example, in the embodiment of FIG. 4, the first reflective plate 110 has the reflective microstructures MS, and the second reflective surface S420 of the second reflective plate 420 is a plane.

FIG. 5 is a cross-sectional view of a first reflective plate and a second reflective plate of still another beam diffusing module of FIG. 1A. Referring to FIG. 5, the beam diffusing module 500 is similar to the beam diffusing module 100 of FIG. 2A, and a difference therebetween is as follows. In the embodiment of FIG. 5, one of the first reflective surface S110 and the second reflective surface S520 of the beam diffusing module 500 has the reflective microstructures MS, and the other one is a reflective curved surface, and the reflective curved surface is a curved surface bending towards a single direction. For example, in the present embodiment, the first reflective surface S110 has the reflective microstructures MS, and the second reflective surface S520 of the second reflective plate 520 is the reflective curved surface, and the second reflective surface 520 is a concave surface bending towards the first reflective plate 110. In detail, in the present embodiment, a divergence angle N of the second reflective surface S520 is −0.9 degree, which means that the second reflective surface S520 has a convergence effect to the incident laser beam 70. The above value range is used as an example, and the disclosure is not limited thereto.

FIG. 6 is a cross-sectional view of a first reflective plate and a second reflective plate of yet another beam diffusing module of FIG. 1A. Referring to FIG. 6, the beam diffusing module 600 is similar to the beam diffusing module 500 of FIG. 5, and a difference therebetween is as follows. The second reflective surface S620 is a convex surface bending towards the first reflective plate 110. In detail, in the present embodiment, the second reflective surface S620 has a radian γ, and the radian γ is 0.9 degree. The above value range is used as an example, and the disclosure is not limited thereto.

In the present embodiment, by configuring the reflective microstructures MS to the first reflective plate 110 of the beam diffusing modules 400, 500 and 600, at least a part of the laser beam 70 is repeatedly reflected in the beam diffusing modules 400, 500 and 600, and the M squared ($M^2$) of the laser beam 70 emitted from the beam diffusing modules 400, 500 and 600 is redistributed along the first direction D1 (i.e. the x-direction), such that a speckle phenomenon of the laser beam 70 is mitigated. In this way, the beam diffusing modules 400, 500 and 600 may also achieve similar functions as that of the beam diffusing module 100, and details thereof are not repeated.

According to the above descriptions, since the beam diffusing modules 400 and 500 may all achieve similar functions as that of the beam diffusing module 100, the beam diffusing modules 400 and 500 can all be applied to the beam generating system 200 of FIG. 1A, and the beam generating system 200 can achieve the similar functions, which is not repeated.

In the aforementioned embodiment, in the beam diffusing module and the beam generating system, by configuring the reflective microstructures to the first reflective plate and the second reflective plate, at least a part of the laser beam is repeatedly reflected in the beam diffusing module by the first reflective plate and the second reflective plate, and the M squared ($M^2$) of the laser beam emitted from the beam diffusing module is redistributed along the first direction. In this way, the speckle phenomenon of the laser beam is mitigated, and the intensity of the linear light spot generated by the beam diffusing module and the beam generating system is more uniform.

Figure 7A:
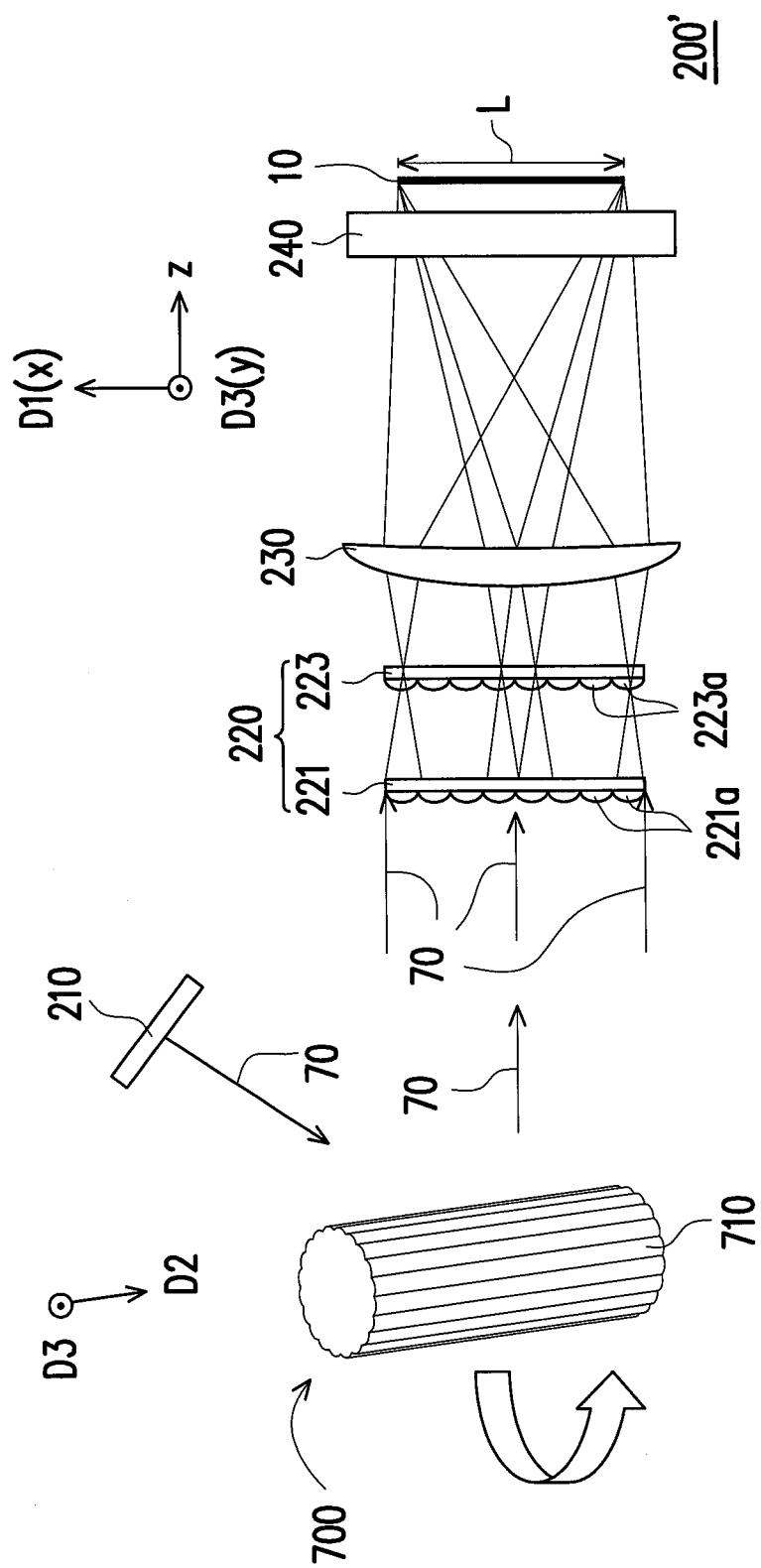
FIG. 7A is a cross-sectional view of a beam generating system according to another embodiment of the disclosure.

However, besides that the reflective microstructures are adapted to the plate-like beam diffusing module (i.e. the first reflective plate and the second reflective plate), the reflective microstructures are also adapted to a cylindrical beam diffusing module. FIG. 7A is a cross-sectional view of a beam generating system according to another embodiment of the disclosure. The beam generating system 200' of the present embodiment includes a laser light source 210, a beam diffusing module 700 and a light homogenizing module 220. The beam generating system 200' is similar to the beam generating system 200 of FIG. 1A, and a difference therebetween is as follows. In the present embodiment, the beam diffusing module 700 includes a continuously rotated reflective cylinder 710. The reflective cylinder 710 is disposed on the transmission path of the laser beam 70, and an outer surface of the reflective cylinder 710 has a plurality of reflective microstructures MS. In the present embodiment, the reflective cylinder 710 axially extends along the second direction D2. Moreover, the reflective microstructures MS are bar-shape microstructures, and extend along the second direction D2. In the present embodiment, the third direction D3 is the y-direction, and the third direction D3 is substantially perpendicular to the first direction D1 (i.e. the x-direction) and the second direction D2. In the present embodiment, the first direction D1 and the second direction D2 are coplanar, and the second direction is substantially perpendicular to the third direction D3, though the disclosure is not limited thereto. When the laser beam 70 emitted from the laser light source 210 enters the beam diffusing module 700, the laser beam 70 contacts the continuously rotated reflective cylinder 710 and reaches the reflective microstructures MS at the outer surface of the reflective cylinder 710, and is reflected to propagate towards the light homogenizing module 220, the subsequent transmission path and behaviours of the laser beam 70 are all the same with that of the laser beam 70 in FIG. 1A and FIG. 1B, which are not repeated.

Figure 7B:
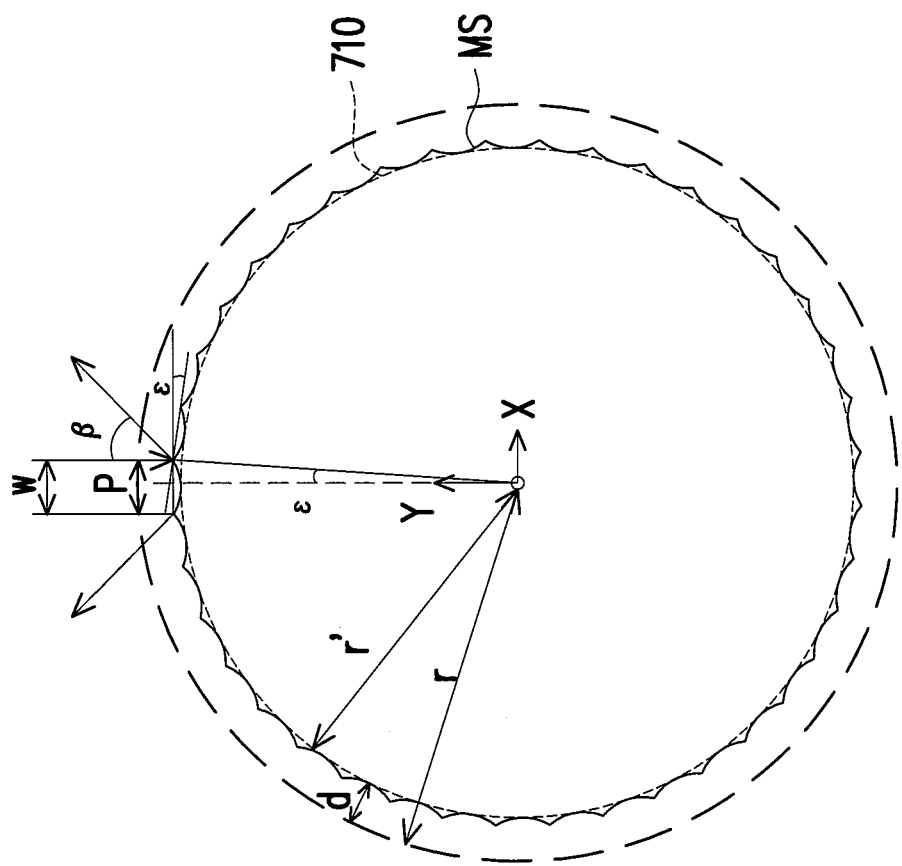
FIG. 7B is a top view of a reflective cylinder of FIG. 7A.

FIG. 7B is a top view of the reflective cylinder of FIG. 7A. Referring to FIG. 7B, in the present embodiment, the reflective microstructures MS are fabricated on the outer surface of the reflective cylinder 710 through an etching method. In detail, in the present embodiment, the etching method is similar to the etching method shown in FIG. 2B, an initial radius of the reflective cylinder 710 is r, and a gap between the holes of the mask determines a pitch P between the reflective microstructures MS. By etching the reflective cylinder 710 by an etching depth d, a plurality of bar-shape curved surfaces are produced on the outer surface of the reflective cylinder 710 to form the reflective cylinder 710 with an actual radius of r', where r'=r−d.

The beam diffusing module 700 is complied with $\theta_m < \beta + \epsilon < 180$, where $\beta$ is a divergence angle of the reflective microstructures MS on the outer surface of the reflective cylinder 710, $\epsilon$ is a divergence angle of a curved surface of the reflective cylinder, and $\theta_m$ is an original divergence angle of the laser beam 70. In an embodiment, when the laser beam 70 is perpendicularly incident on the reflective cylinder 710, a maximum divergence angle thereof is $$\beta + \varepsilon = 2\sin^{-1}\frac{P}{2d} + \sin^{-1}\left(\frac{W}{2r'}\right),$$

where W is a width of the laser beam 70. Further, in the present embodiment, at least a part of the laser beam 70 emitted from the laser light source 210 enters the beam diffusing module 700 and is incident on the reflective microstructures MS of the reflective cylinder 710, and since the divergence angle $\theta_m$ of the laser beam 70 can be adjusted by the divergence angle $\beta$ of the reflective microstructures MS when the laser beam 70 is reflected once in the beam diffusing module 700, and the continuously rotated reflective cylinder 710 can also simultaneously provide the divergence angle $\epsilon$ of the curved surface, the M squared of the laser beam 70 can be redistributed.

In this way, by configuring the reflective microstructures MS to the beam diffusing module 700, at least a part of the laser beam 70 is reflected once in the beam diffusing module 700 by the reflective microstructures MS on the reflective cylinder 710, and since the reflective cylinder 710 is continuously rotated, the laser beam 70 entering the beam diffusing module 700 randomly reaches any portion of the reflective microstructures MS. The reflective microstructures MS may produce reflected beams of various angles due to different incident angles, so as to achieve a homogenisation effect to the laser beam 70, and the M squared of the laser beam 70 emitted from the beam diffusing module 700 redistributes along the first direction D1 (i.e. the x-direction), and the laser beam 70 forms single direction homogenization (i.e. to increase $M_x^2$) along the first direction D1 (i.e. the x-direction) without influencing distribution of the laser beam 70 along the third direction D3 (i.e. the y-direction), i.e. $M_y^2$ is maintained unchanged.

Further, a pulse repetition frequency of the laser beam 70 and a rotating speed of the reflective cylinder 710 may influence the homogenization effect of the laser beam 70. In an embodiment, when a ratio between the pulse repetition frequency of the laser beam 70 entering the beam diffusion module 700 and a tangential speed of the reflective microstructure MS at a place where the laser beam 70 reaches is smaller than or equal to 500, a better homogenization effect is achieved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A beam diffusing module, adapted to change an M squared of a laser beam along a first direction, the beam diffusing module comprising:
   a light incident terminal;
   a light emitting terminal, wherein the laser beam sequentially passes through the light incident terminal and the light emitting terminal;
   a first reflective plate, having a first reflective surface, the first reflective plate being disposed on a transmission path of the laser beam and extending from the light incident terminal to the light emitting terminal; and a second reflective plate, having a second reflective surface, the second reflective plate being disposed on the transmission path of the laser beam and extending from the light incident terminal to the light emitting terminal, wherein the first reflective surface and the second reflective surface are opposite to each other, at least one of the first reflective surface of the first reflective plate and the second reflective surface of the second reflective plate has a plurality of reflective microstructures, the reflective microstructures are arranged along a second direction from the light incident terminal towards the light emitting terminal, at least a part of the laser beam enters the beam diffusing module through the light incident terminal and emerges from the light emitting terminal to cause the M squared of the laser beam emitted from the beam diffusing module to be redistributed along the first direction, wherein the beam diffusing module complies with $\theta_m<(N+M)K/2<180$, wherein N is a divergence angle of the first reflective surface for the laser beam, M is a divergence angle of the second reflective surface for the laser beam, K is a number of reflecting times of the laser beam reflected by the first reflective surface and the second reflective surface, and $\theta_m$ is an original divergence angle of the laser beam.

2. The beam diffusing module as claimed in claim 1, wherein a ratio between the M squared of the laser beam along the first direction that is emitted from the beam diffusing module and the M squared of the laser beam along a third direction that is emitted from the beam diffusing module is greater than or equal to 5, and the third direction is substantially perpendicular to the first direction and the second direction.

3. The beam diffusing module as claimed in claim 2, wherein the first reflective plate and the second reflective plate are arranged along a fourth direction, and a direction along which the laser beam is incident on the beam diffusing module and the fourth direction have an included angle therebetween.

4. The beam diffusing module as claimed in claim 3, wherein the second direction, the third direction and the fourth direction are substantially perpendicular to each other.

5. The beam diffusing module as claimed in claim 3, wherein a section line obtained by cutting the reflective microstructures along a second direction and a direction perpendicular to the third direction comprises a plurality of depressed curves, and a section line obtained by cutting each of the reflective microstructures along the third direction and a direction perpendicular to the second direction is a straight line.

6. The beam diffusing module as claimed in claim 1, wherein each of the reflective microstructures has a divergence angle, and the divergence angle of each of the reflective microstructures falls within a range of 0.1 degree to 5 degrees.

7. The beam diffusing module as claimed in claim 6, wherein the divergence angles of at least a part of the reflective microstructures are different, and the reflective microstructures having different divergence angles are randomly arranged along the second direction.

8. The beam diffusing module as claimed in claim 7, wherein a pitch of the reflective microstructures is 50±10 µm.

9. The beam diffusing module as claimed in claim 7, wherein the reflective microstructures construct a plurality of reflective microstructure groups, and the reflective microstructure groups are arranged along the second direction, and the number of the reflective microstructures having the same divergence angle in each of the reflective microstructure groups is the same.

10. The beam diffusing module as claimed in claim 6, wherein the divergence angles of at least a part of the reflective microstructures are different, and the reflective microstructures having different divergence angles are arranged along the second direction in alternation.

11. The beam diffusing module as claimed in claim 6, wherein both of the first reflective surface and the second reflective surface have the reflective microstructures, and each of the reflective microstructures on the first reflective surface corresponds to one of the reflective microstructures on the second reflective surface, and the divergence angles of the corresponding reflective microstructures are the same.

12. The beam diffusing module as claimed in claim 6, wherein both of the first reflective plate and the second reflective plate have the reflective microstructures, and each of the reflective microstructures on the first reflective plate corresponds to one of the reflective microstructures on the second reflective plate, and the divergence angles of the corresponding reflective microstructures are different.

13. The beam diffusing module as claimed in claim 1, wherein one of the first reflective surface and the second reflective surface has the reflective microstructures, and the other one of the first reflective surface and the second reflective surface is a reflective curved surface, and the reflective curved surface is a curved surface bending towards a single direction.

14. A beam generating system, comprising:
a laser light source, outputting a laser beam;
the beam diffusing module as claimed in claim 1, disposed on a transmission path of the laser beam; and
a light homogenizing module, disposed on the transmission path of the laser beam emitted from the beam diffusing module.

15. The beam generating system as claimed in claim 14, wherein the laser beam is a pulse laser beam, and a wavelength of the laser beam falls within a range of 50 nm to 1000 µm.

16. The beam generating system as claimed in claim 14, wherein the light homogenizing module comprises:
a first lenticular lens array, disposed on the transmission path of the laser beam emitted from the beam diffusing module; and
a second lenticular lens array, disposed on the transmission path of the laser beam emitted from the first lenticular lens array.

17. The beam generating system as claimed in claim 16, wherein the first lenticular lens array comprises a plurality of first micro-lenticular lenses, each of the first micro-lenticular lenses extends along a third direction, and the first micro-lenticular lenses are arranged along the first direction, the second lenticular lens array comprises a plurality of second micro-lenticular lenses, each of the second micro-lenticular lenses extends along the third direction, and the second micro-lenticular lenses are arranged along the first direction.

18. The beam generating system as claimed in claim 14, wherein the beam generating system further comprises a light converging lens and a third lenticular lens, a curved surface of the third lenticular lens is not curved along the first direction and is curved along a third direction, the light converging lens is disposed on the transmission path of the laser beam emitted from the light homogenizing module, and is located between the light homogenizing module and the third lenticular lens.

19. The beam generating system as claimed in claim 18, wherein the curved surface of the third lenticular lens faces to the beam diffusing module.

20. The beam diffusing module as claimed in claim 14, wherein a ratio between the M squared of the laser beam along the first direction that is emitted from the beam diffusing module and the M squared of the laser beam along a third direction that is emitted from the beam diffusing module is greater than or equal to 5, and the third direction is substantially perpendicular to the first direction and the second direction.

21. The beam diffusing module as claimed in claim 20, wherein the first reflective plate and the second reflective plate are arranged along a fourth direction, and a direction along which the laser beam is incident on the beam diffusing module and the fourth direction have an included angle therebetween.

22. The beam diffusing module as claimed in claim 21, wherein the second direction, the third direction and the fourth direction are substantially perpendicular to each other.

23. The beam diffusing module as claimed in claim 21, wherein a section line obtained by cutting the reflective microstructures along a second direction and a direction perpendicular to the third direction comprises a plurality of depressed curves, and a section line obtained by cutting each of the reflective microstructures along the third direction and a direction perpendicular to the second direction is a straight line.

24. The beam diffusing module as claimed in claim 14, wherein each of the reflective microstructures has a divergence angle, and the divergence angle of each of the reflective microstructures falls within a range of 0.1 degree to 5 degrees.

25. The beam diffusing module as claimed in claim 24, wherein the divergence angles of at least a part of the reflective microstructures are different, and the reflective microstructures having different divergence angles are randomly arranged along the second direction.

26. The beam diffusing module as claimed in claim 25, wherein a pitch of the reflective microstructures is 50±10 µm.

27. The beam diffusing module as claimed in claim 25, wherein the reflective microstructures construct a plurality of reflective microstructure groups, and the reflective microstructure groups are arranged along the second direction, and the number of the reflective microstructures having the same divergence angle in each of the reflective microstructure groups is the same.

28. The beam diffusing module as claimed in claim 24, wherein the divergence angles of at least a part of the reflective microstructures are different, and the reflective microstructures having different divergence angles are arranged along the second direction in alternation.

29. The beam diffusing module as claimed in claim 24, wherein both of the first reflective surface and the second reflective surface have the reflective microstructures, and each of the reflective microstructures on the first reflective surface corresponds to one of the reflective microstructures on the second reflective surface, and the divergence angles of the corresponding reflective microstructures are the same.

30. The beam diffusing module as claimed in claim 24, wherein both of the first reflective plate and the second reflective plate have the reflective microstructures, and each of the reflective microstructures on the first reflective plate corresponds to one of the reflective microstructures on the second reflective plate, and the divergence angles of the corresponding reflective microstructures are different.

31. The beam diffusing module as claimed in claim 14, wherein one of the first reflective surface and the second reflective surface has the reflective microstructures, and the other one of the first reflective surface and the second reflective surface is a reflective curved surface, and the reflective curved surface is a curved surface bending towards a single direction.

32. A beam generating system, comprising:
a laser light source, outputting a laser beam;
a beam diffusing module, adapted to change an M squared of the laser beam along a first direction, and the beam diffusing module comprising:
a reflective cylinder, disposed on a transmission path of the laser beam, an outer surface of the reflective cylinder having a plurality of reflective microstructures, wherein the reflective cylinder axially extends along a second direction, and the reflective microstructures have a bar-shape and extend along the second direction; and
a light homogenizing module, disposed on a transmission path of the laser beam emitted from the light diffusing module,
wherein at least a part of the laser beam enters the beam diffusing module, and is incident on the reflective microstructures of the reflective cylinder, and is further reflected and propagated towards the light homogenizing module to cause the M squared of the laser beam emitted from the beam diffusing module to be redistributed along the first direction,
the beam diffusing module complies with $\theta_m < \beta + \epsilon < 180$, wherein $\beta$ is a divergence angle of the reflective microstructures on the outer surface of the reflective cylinder, $\epsilon$ is a divergence angle of a curved surface of the reflective cylinder, and $\theta_m$ is an original divergence angle of the laser beam.

33. The beam generating system as claimed in claim 32, wherein a ratio between a pulse repetition frequency of the laser beam and a tangential speed of the reflective microstructure at a place where the laser beam reaches is smaller than or equal to 500.

* * * * *